(12) United States Patent
Yamasaki

(10) Patent No.: US 6,901,074 B1
(45) Date of Patent: May 31, 2005

(54) COMMUNICATION METHOD AND COMMUNICATIONS SYSTEM

(75) Inventor: Nobuyuki Yamasaki, c/o Electrotechnical Laboratory, 1-1-4, Umezono, Tsukuba-shi, Ibaraki 305-8568 (JP)

(73) Assignees: Secretary of Agency of Industrial Science and Technology, Tokyo (JP); Nobuyuki Yamasaki, Kanagawa (JP)

( * ) Notice: Subject to any disclaimer, the term of this patent is extended or adjusted under 35 U.S.C. 154(b) by 0 days.

(21) Appl. No.: 09/452,351

(22) Filed: Dec. 1, 1999

(30) Foreign Application Priority Data

Dec. 3, 1998 (JP) .......................................... 10-360025

(51) Int. Cl.[7] .......................... H04L 12/28; H04L 12/56
(52) U.S. Cl. ........................ 370/400; 370/412; 370/392
(58) Field of Search ................................ 370/400, 401, 370/402, 412, 413, 414, 417, 418, 425, 431, 432, 437, 442, 447, 449, 455, 458, 461, 462, 465, 475, 498, 536, 537, 216–218, 225, 228, 229, 235, 242, 351, 352, 357, 360, 389–392, 395.1, 396–397, 395.2, 395.21, 395.3, 395.31, 395.4, 395.41, 395.42, 396.65

(56) References Cited

U.S. PATENT DOCUMENTS

| | | | | |
|---|---|---|---|---|
| 4,623,996 A | * | 11/1986 | McMillen | .................... 370/418 |
| 4,679,190 A | * | 7/1987 | Dias et al. | ................... 370/355 |
| 5,164,939 A | * | 11/1992 | Shobatake | ................... 370/416 |
| 5,218,676 A | | 6/1993 | Ben-Ayed et al. | .......... 709/240 |
| 5,784,374 A | | 7/1998 | Runaldue | .................... 376/414 |
| 5,912,877 A | * | 6/1999 | Shirai et al. | ................ 370/228 |
| 6,327,248 B1 | * | 12/2001 | Hosokawa et al. | ......... 370/235 |
| 6,393,548 B1 | * | 5/2002 | Kerstein et al. | .............. 712/43 |
| 6,411,598 B1 | * | 6/2002 | McGlade | .................... 370/217 |
| 6,501,760 B1 | * | 12/2002 | Ohba et al. | ............ 370/395.42 |

FOREIGN PATENT DOCUMENTS

| | | |
|---|---|---|
| JP | 58-151747 | 9/1983 |
| JP | 62-260452 | 11/1987 |
| JP | 1303832 | 12/1989 |
| JP | 624939 | 8/1994 |
| JP | 8191328 | 7/1996 |
| JP | 82242256 | 9/1996 |
| JP | 10-307803 | 11/1998 |
| JP | 11008652 | 1/1999 |

* cited by examiner

*Primary Examiner*—Brian Nguyen
(74) *Attorney, Agent, or Firm*—Workman Nydegger

(57) ABSTRACT

A real-time communications system for decentralized management is accomplished which was not implemented conventionally. To achieve this, the following techniques are employed: (1) Overtaking of communication packets based on priority; (2) Path control based on the priority; and (3) Priority change at each node. When carrying out real-time communication between a plurality of information processors, each communication node (information processor) carries out overtaking of the communication packets in accordance with the priority. In the course of this, each communication node can change the priority, and establish different paths for each of the priority.

6 Claims, 13 Drawing Sheets

STATE 1

STATE 2

STATE 3

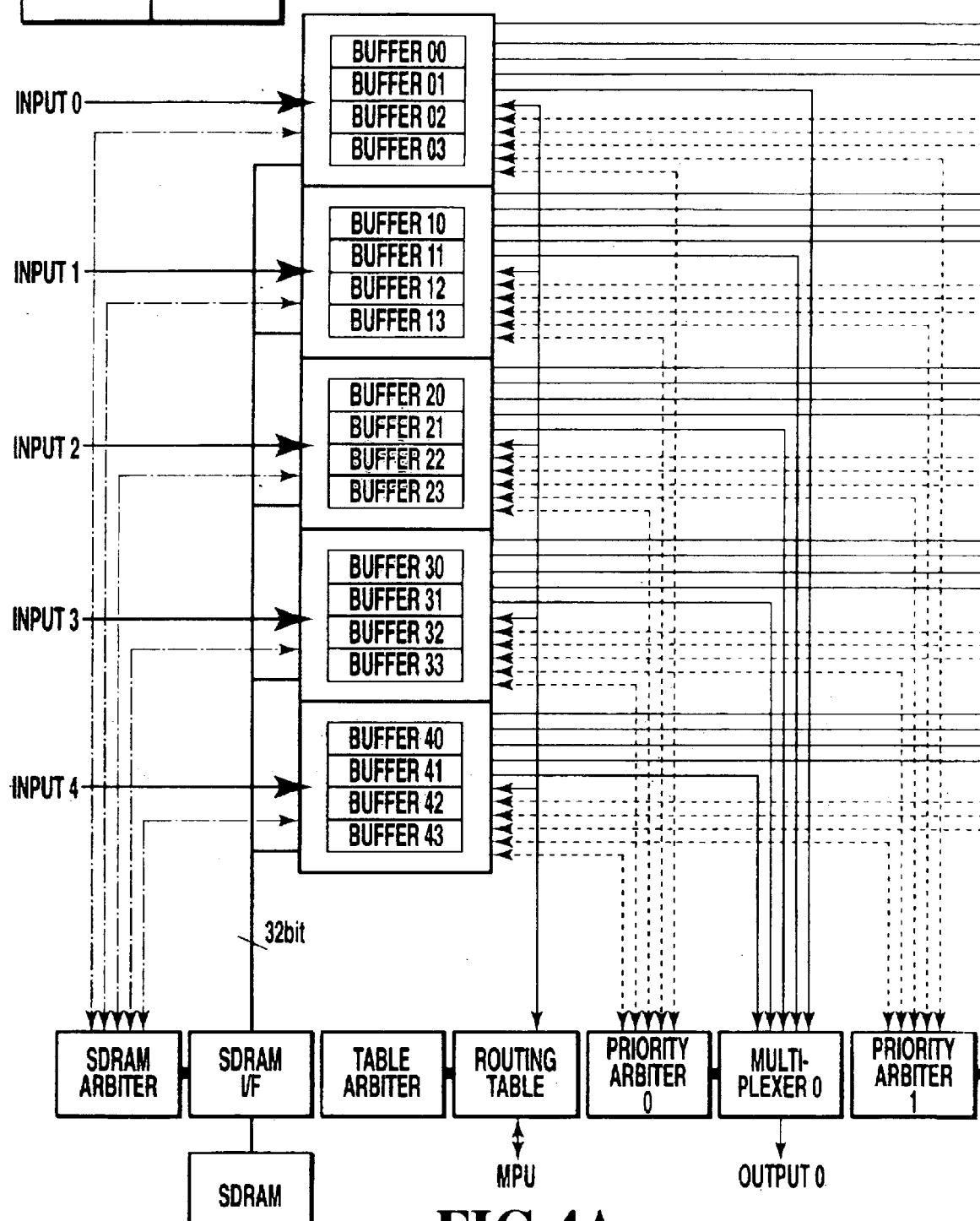

FIG.10

| FIG.10A |
|---------|
| FIG.10B |

FIG.10A

EVENT PACKET FORMAT (16 BYTES)

| SOURCE ADDRESS | DESTINATION ADDRESS |
|---|---|
| PAYLOAD | |
| CONTROL AND STATUS | |

DATA PACKET FORMAT (64 BYTES)

| SOURCE ADDRESS | DESTINATION ADDRESS | | |
|---|---|---|---|
| PAYLOAD | | | |
| | | | |
| | | | |
| CONTROL AND STATUS | | | |

COMMUNICATION METHOD AND COMMUNICATIONS SYSTEM

This application is based on Patent Application No. 10-360025 filed Dec. 3, 1998 in Japan, the content of which is incorporated hereinto by reference.

BACKGROUND OF THE INVENTION

1. Field of the Invention

The present invention relates to a communications method and a communications system that can implement hard real-time communication required for various decentralized real-time control of robots, vehicles, plants, home automation etc., and soft real-time communication required for achieving smooth transmission of multimedia data like images and voices.

2. Description of the Related Art

In conventional real-time communication isochronous data transfers and the like) such as USB and IEEE 1394, a main communication control and management unit, which carries out centralized management of the bandwidth of communication data, is used to reserve the bandwidth of communication in advance and to perform exclusive management of the bandwidth. In other words, the main communication control and management unit enables the real-time communication by the centralized management of the bandwidth. In such a centralized management system, it is difficult to construct a large-scale real-time communications system (maximum of 127 nodes in the USB, and 63 nodes in the IEEE 1394). In addition, when the main communication control and management unit fails, all the communications are halted.

Furthermore, there are no practical conventional systems capable of assigning priority to communication packets to enable overtaking. Even an experimental system that allows overtaking of communication packets cannot control the real-time communication with enabling low latency overtaking of communication packets, with obviating the need for retransmission of communication packets, or with accelerating or decelerating communication packets by changing the priority at each communication node.

Japanese patent application laid-open No. 62-260452 (1987) implements a circuit switching by utilizing a multistage interconnection network (MIN) and by assigning priority to communication packets. It is originally a patent application for a telephone circuit that carries out packet or circuit switching by assigning priority to such requests as a called setup request, a calling setup request and an asynchronous data request. It implements soft real-time communication for voice packets by assigning higher priority to voice packets for communicating voice data, and realizes non-real-time data packet communication utilizing the remaining bandwidth. The system, however, inputs and outputs the communication packets through multistage subswitches depending on the number of ports, and this presents a problem of increasing the latency as the number of ports increases because of increasing the number of subswitch stages, although this can broaden the bandwidth. Furthermore, it is necessary for an initial communication to open a circuit, resulting in considerable latency. Moreover, a state can continue for a long time in which lower priority packets cannot be transmitted from a calling node because no circuit opens. Thus, although the system is suitable for the soft real-time communication like voice communication, it is unsuitable for hard real-time communication used for system control.

In the conventional systems, communication packets with the same network addresses are transmitted from a source node to a destination node through the same path at a certain instant, and hence it is impossible to establish one or more exclusive lines or one or more alternative paths for these communication packets at the same time.

Japanese patent application laid-open No. 58-151747 (1983) discloses a system that can assign prescribed classes to respective terminals connected to a packet switching system, and carry out routing in accordance with the classes (corresponding to priorities) assigned to the terminals. The classes are assigned to the terminals, and in a failure the packets from terminals assigned higher priority can pass through an alternative path using a routing table statically set in advance. The system can be set in such a manner that the packets from lower priority terminals are allowed to pass only through an alternative path in a normal state, and are discarded during a failure. However, because the classes are attached to the terminals, and the routing can be changed only in a transition from the normal state to a failure, dynamic change of the routing cannot be achieved in the normal state. In addition, since communication is carried out from a source node to a destination node only through a single path at a certain moment, it is impossible to perform simultaneous communication by establishing multiple paths in the routing.

SUMMARY OF THE INVENTION

An object of the present invention is to implement a real-time communications system with decentralized management. To accomplish the object, a method for controlling the real-time communication can be implemented by assigning priority to communication packets so that a higher priority communication packet can overtake a lower priority communication packet at each communication node with low latency without requiring any retransmission of a communication packet. Alternatively, a method for controlling the real-time communication can be implemented by controlling latency and bandwidth by establishing different paths for communication packets with the same network addresses (source address and destination address) in accordance with the priority so as to establish one or more exclusive lines or one or more alternative paths. Still another real-time communication control method can be implemented by means of the decentralized management that accelerates or decelerates the communication packets by changing their orders of priority at each communication node, or that carries out decentralized control of the routing.

To accomplish the foregoing object, in a first aspect of the present invention, there is provided a communications method in a communications system having a plurality of communication nodes each of which is provided with an information processor, the communications method carrying out communication between selected information processors using communication packets, the communications method comprising the steps of: accepting an incoming communication packet with priority at one of the communication nodes; and controlling, when a plurality of communication packets accepted at the step of accepting at one of the communication nodes have the same output destination, a communication packet with a higher priority to be outputted first.

Here, the step of controlling may comprise the substeps of: buffering, by using a plurality of packet overtaking buffers provided for individual input ports of the communication nodes, a communication packet to be overtaken in accordance with the priority when a collision takes place between communication packets; making an output request from each input port side to one or more output port sides, the output request with priority assigned to an input communication packet; carrying out arbitration of output from the each input port side using a priority arbiter for the communication packets which is allocated to each output port; and outputting an input packet to the each output port side independently in accordance with the output arbitration.

The communications method may further comprise the step of controlling acceleration or deceleration of the communication packets by changing priority of the communication packets at the communication nodes.

According to a second aspect of the present invention, there is provided a communications method in a communications system having a plurality of communication nodes each of which is provided with an information processor, the communications method carrying out communication between selected information processors using communication packets, the communications method comprising the steps of: accepting an incoming communication packet with priority at one of the communication nodes; and outputting the communication packet accepted at the step of accepting at one of the communication nodes such that the communication packet is routed to different paths which are established or changed in accordance with the priority of the communication packet, and through which simultaneous communications can be realized.

Here, the communications method may further comprise the step of controlling routing of the communication packets by changing priority of the communication packets at the communication nodes.

According to a third aspect of the present invention, there is provided a communications system having a plurality of communication nodes each of which is provided with an information processor, the communications system carrying out communication between selected information processors using communication packets, each of the communications nodes comprising: means for accepting an incoming communication packet with priority; and control means for outputting, when a plurality of communicating packets accepted by means for accepting have the same output destination, a communication packet with a higher priority first.

Here, the control means may comprise: means for buffering, by using a plurality of packet overtaking buffers provided for individual input ports of the communication nodes, a communication packet to be overtaken in accordance with the priority when a collision takes place between communication packets; means for making an output request from each input port side to at least one output port side, the output request with priority assigned to an input communication packet; means for carrying out arbitration of output from the each input port side using a priority arbiter for the communication packets which is allocated to each output port; and means for outputting an input packet to each output port side independently in accordance with the output arbitration.

Each of the communication nodes may further comprise means for controlling acceleration or deceleration of the communication packets by changing priority of the communication packets.

According to a fourth aspect of the present invention, there is provided a communications system having a plurality of communication nodes each of which is provided with an information processor, the communications system carrying out communication between selected information processors using communication packets, each of the communication nodes comprising: means for accepting an incoming communication packet with priority; and means for establishing or changing a path of the communication packet accepted by the means for accepting to different paths through which simultaneous communications can be realized in accordance with the priority of the communication packet.

Here, each of the communication nodes may further comprise means for controlling routing of the communication packets by changing priority of the communication packets.

The foregoing configuration can implement the real-time communications system with decentralized management, and accomplish large-scale real-time communications with short quantum time.

The above and other objects, effects, features and advantages of the present invention will become more apparent from the following description of embodiments thereof taken in conjunction with the accompanying drawings.

BRIEF DESCRIPTION OF THE DRAWINGS

FIG. 4 is a diagram showing relationship between FIGS. 4A and 4B;

FIG. 4A is a block diagram showing a 5-input, 5-output network switch with four overtaking buffers per input;

FIG. 10 is a diagram showing relationship between FIGS. 10A and 10B:

FIG. 10A is a diagram showing a Responsive Link packet format;

DETAILED DESCRIPTION OF PREFERRED EMBODIMENTS

Figure 1:
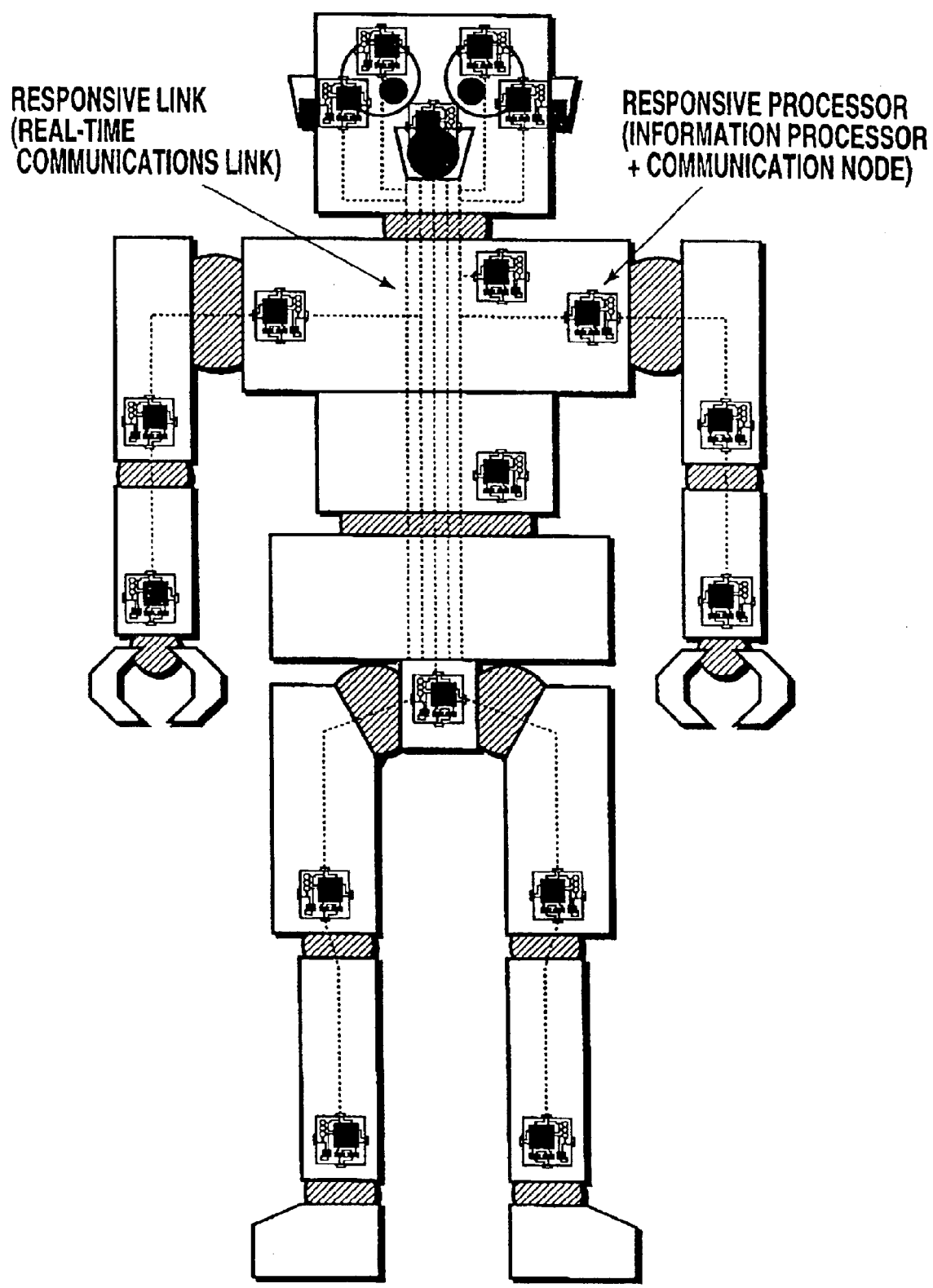
FIG. 1 is a diagram showing a decentralized control system applied to a humanoid robot.

FIG. 1 shows an example of a decentralized real-time control system in a humanoid robot. This example constructs a humanoid robot system by interconnecting information processors for controlling functional blocks (such as the head, eyes, ears and mouth) using a real-time communication link applying the present invention.

In this example, it is preferable that hard real-time communications be used to assure latency needed for controlling motors and sensors, and soft real-time communications to ensure bandwidth required for communicating images and voice data.

Figure 2:
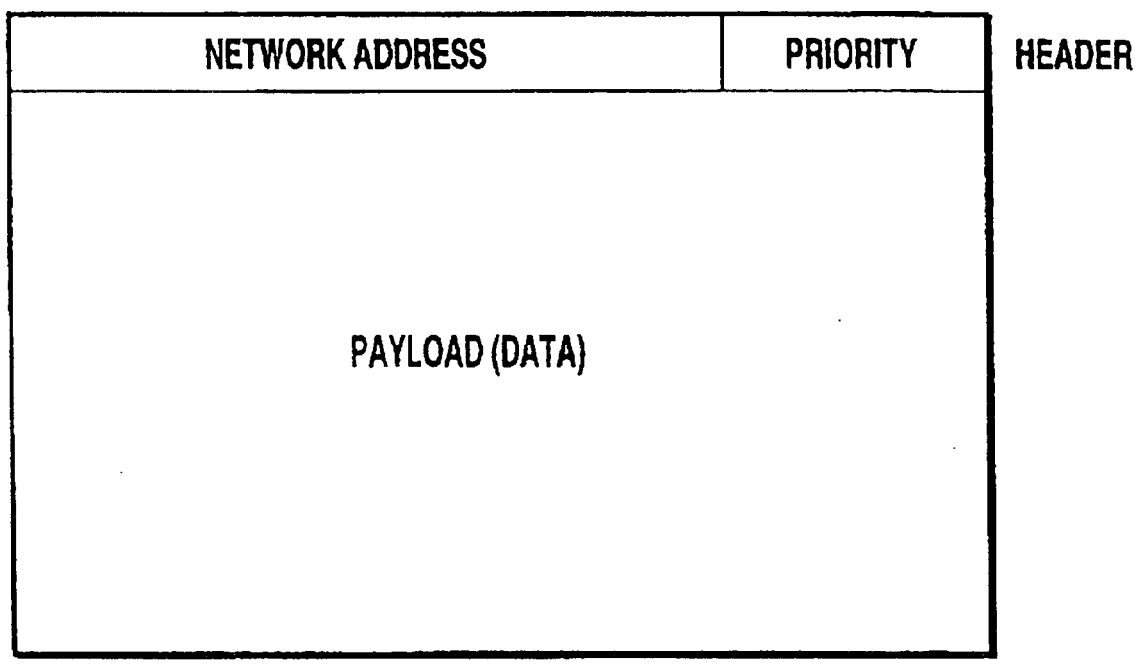
FIG. 2 is a diagram showing a packet format including priority added to the header of a communication packet.

FIG. 2 is a diagram showing a format of a communication packet with a header including the order of priority. As shown in FIG. 2, the header of the communication packet includes along with network addresses (source address, destination address and the like) the order of priority that is arranged in ascending order with the lowest order being assigned zero.

Figure 3:
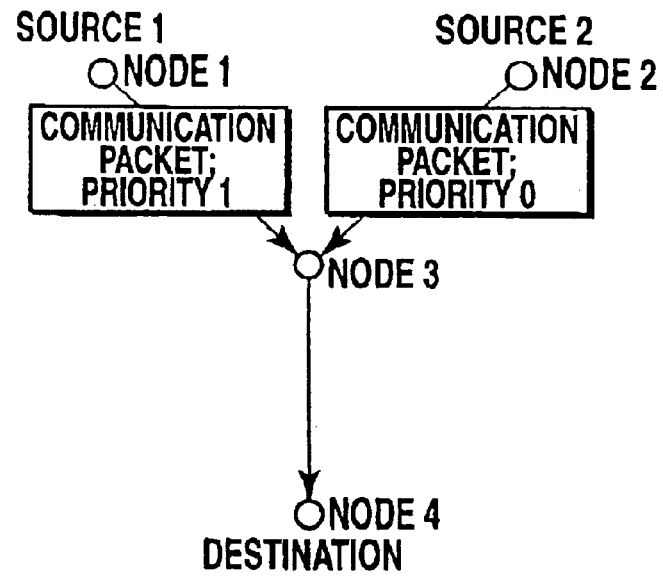
FIG. 3 is a diagram illustrating an overtaking example of communication packets in accordance with the priority.
Figure 3:
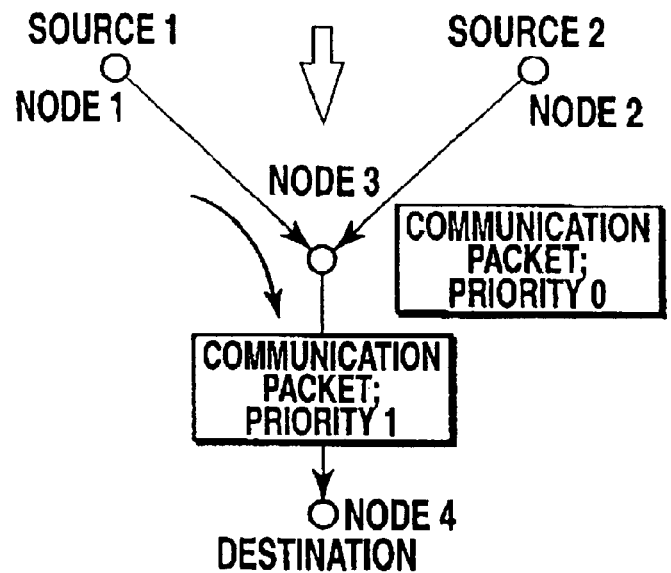
Figure 3:
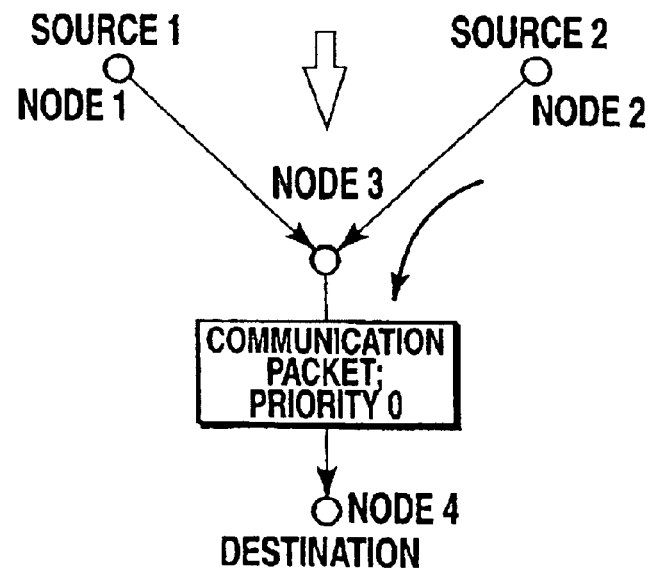

FIG. 3 shows an example in which four communication nodes are star connected, and a communication node 1 (source node 1) and a communication node 2 (source node 2) transmit a communication packet simultaneously to a communication node 4 through a communication node 3. In state 1, the communication node 1 transmits a communication packet with priority 1 to the communication node 3, and the communication node 2 transmits a communication packet with priority 0 to the communication node 3. In state 2, although the communication node 3 receives the communication packets from the communication nodes 1 and 2, it transfers only the communication packet with the higher priority from the communication node 1 to the communication node 4, and detains the communication packet with the lower priority from the communication node 2. In state 3, the communication node 3 transfers the communication packet with the lower priority from the communication node 2 to the communication node 4, after completing the transmission of the communication packet from the communication node 1 to the communication node 4. To achieve such transmission, the following control steps are taken.

Figure 4B:
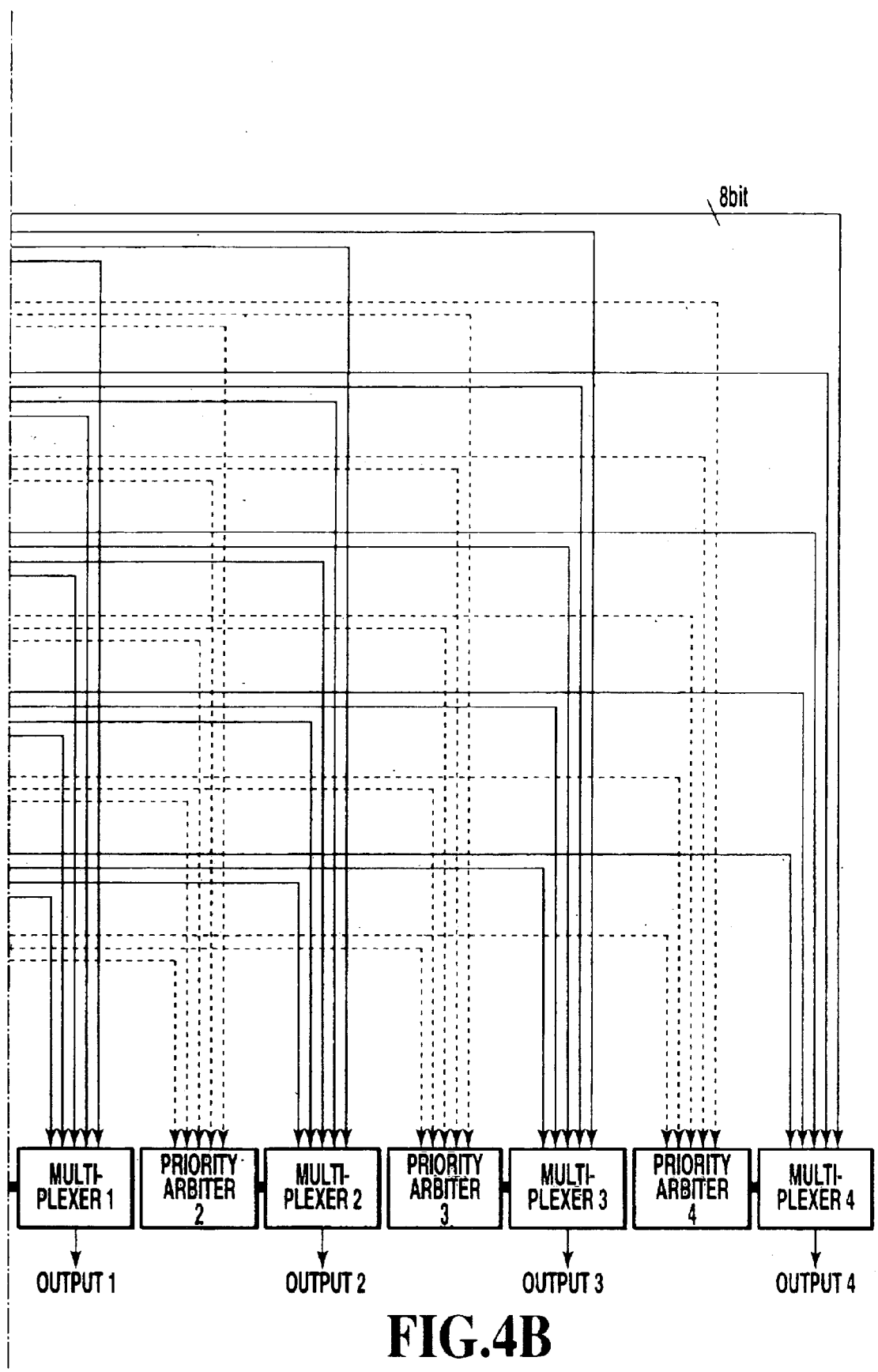
FIG. 4B is a block diagram showing the 5-input, 5-output network switch with four overtaking buffers per input.

FIGS. 4A and 4B show a 5-input, 5-output network switch with four overtaking buffers per input. When incoming communication packets through the input ports do not collide in the communication node, they are immediately transferred to the output ports. When communication packets from different input ports are transferred to the same output port in FIGS. 4A and 4B, the communication packets with lower priority are detained in the buffers (temporary storage for receiving and transferring data) in accordance with the priority assigned to the communication packets, so that higher priority communication packets are transmitted earlier. Thus, the lower priority communication packets are supplied from the buffers to the output ports after the higher priority communication packets, so that the overtaking of the communication packets is carried out in accordance with the order of priority.

To achieve the overtaking of the communication packets, a plurality of buffers which size is same as the size of the communication packet are provided on the input port side. In addition, a storage (memory) can be installed for temporarily saving the contents of the buffers as an insurance against the overflow of the buffers due to the continued input of the input packets during the detaining of the packets in the buffer.

Figure 5:
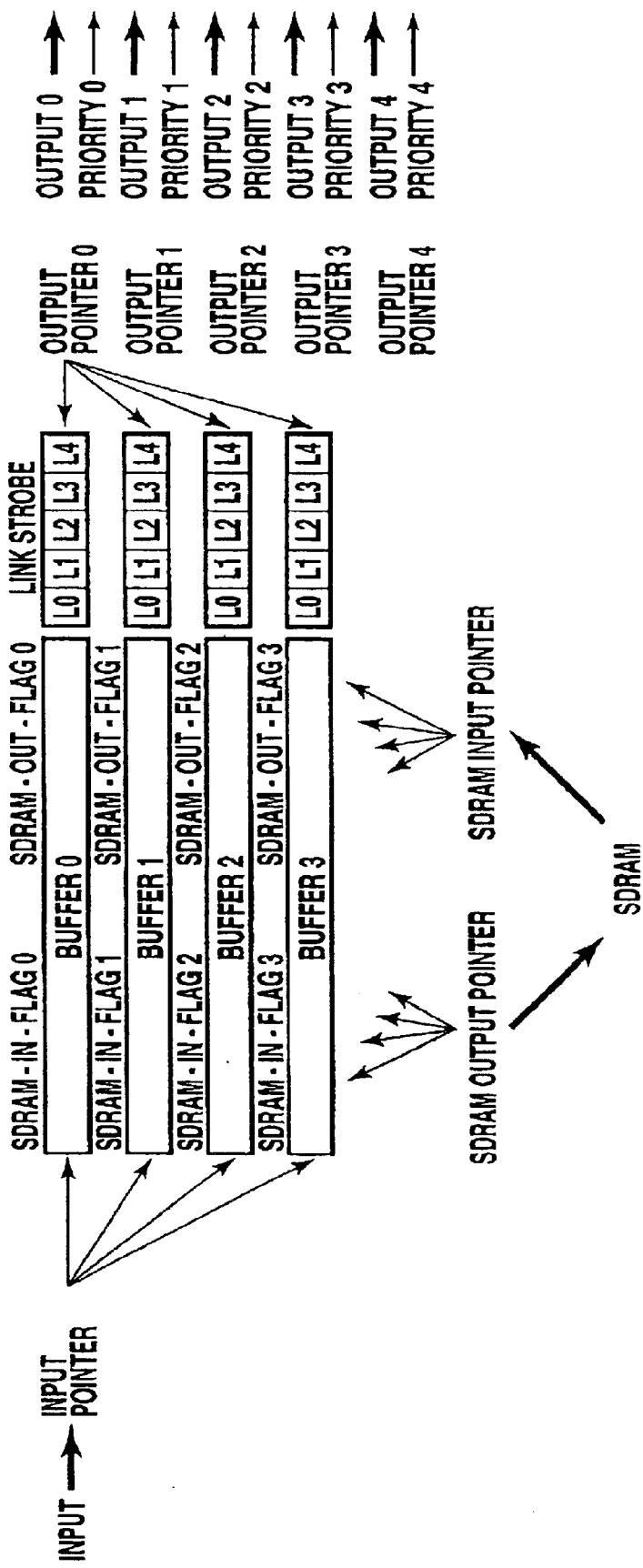
FIG. 5 is a block diagram showing the detail of the input sections of the network switch as shown in FIGS. 4A and 4B.
Figure 6:
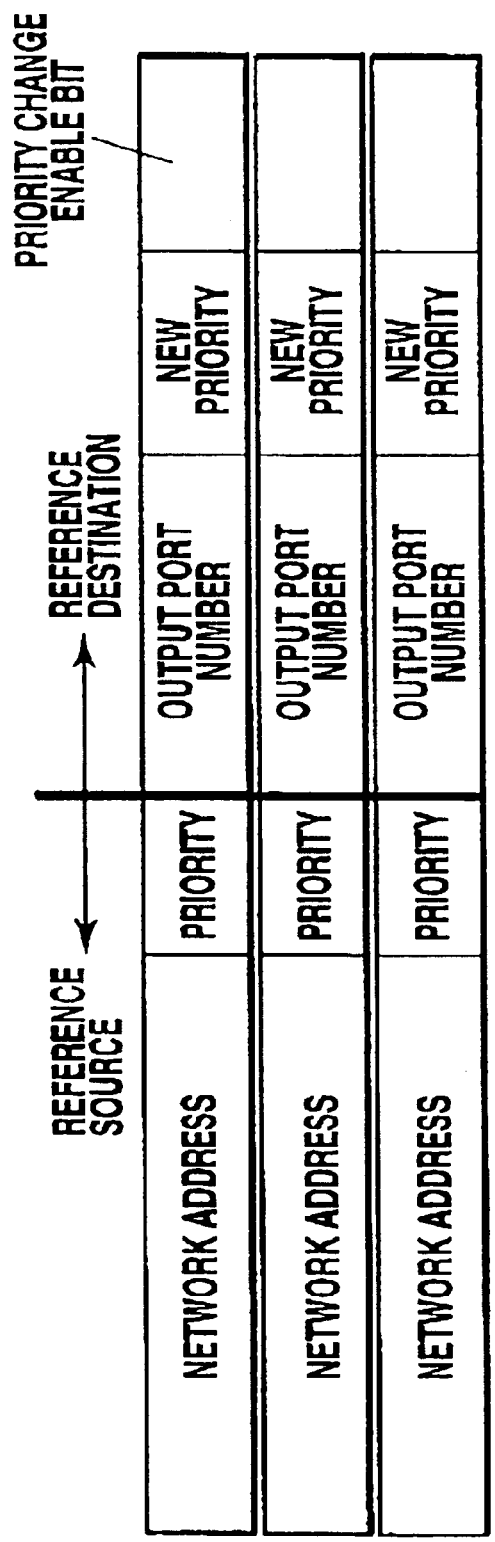
FIG. 6 is a diagram showing a routing table (routing control table) for obtaining the output port number and priority from the header of the received incoming packet.

FIG. 5 shows the input section of one of the network switches of FIGS. 4A and 4B in more detail. The overtaking control of the communication packets is carried out as follows. An incoming communication packet through the input port is written into one of vacant buffers 0–3 indicated by an input pointer. The header of the input packet is always received, and is written into the buffer. The output port number and priority are obtained by referring to the routing table (routing control table) as shown in FIG. 6 in accordance with the header received. The output port number obtained is written into a link strobe (with bits L0–L4) in FIG. 5, in which an enabled L0 bit, for example, indicates that the output destination of the input packet is the output port 0.

In FIG. 5, multicasting is implied when two or more of the bits L0–L4 are enabled, and broadcasting is implied 6 when all of them are enabled. The output side of the input section refers to its link strobe for each output port independently, and when the link strobe of the output port is enabled, it sends an output request and the priority to the corresponding priority arbiter provided for respective output ports (see, FIGS. 4A and 4B). The priority arbiter gives output permission to the output request when it is sent from only one of the input ports, and to one of the requests with the highest priority when multiple output requests take place. The output permission can be assigned using round robin scheduling, etc., when there are plurality of output requests with the highest priority.

Thus, the output is immediately started of a communication packet without collision or of a currently highest priority communication packet in the collision only after the latency involved in receiving the header and referring to the routing table. Each output port side of the input section disables the current link strobe independently when the packet transmission is completed, and when all the link strobe are disabled, the buffer becomes vacant. One or more vacant buffers are always prepared as an insurance against the overflow of the buffer due to the continued input of the input packets during the detaining of the packets in the buffer.

If the vacant buffers are reduced (to one buffer, for example) in FIG. 5, the next input packet is saved in the saving storage (such as an SDRAM). On the other hand, when an increasing number of (two or more) buffers becomes vacant because of the outputs, the input packet saved in the saving storage is returned to the buffer considering the priority. Thus, the output is continued.

In FIG. 5, the SDRAM output pointer points the save address in the SDRAM of the input packet to be saved, and the SDRAM input pointer points the vacant buffer to which the data is restored. In the real-time communication, retransmission will sharply increase an overhead, and hence increase the quantum time. Accordingly, the quantum time in the real-time communication can be greatly reduced by omitting the retransmission.

One or more exclusive lines or one or more alternative paths can be established by enabling the communication packets with the same network addresses to be assigned simultaneously to different paths available in accordance with the priority. In this case, different paths can be established for transmission and reception. Thus, communications can be achieved between the source node and 26 the destination node using multiple different paths established in accordance with the priority, and the bandwidth can be broadened. These functions enables the control of the latency of the communication packets as well as the traffic control.

Although the routing table is primarily referred to by using a pair of the network address and priority, if the routing table has the paths with the same network address, but does not have the path with the same network address and the same priority, the path with the lowest priority 0 is selected as a default path.

More specifically:
(1) When not only the network addresses but also priority agree with each other, the path has the first priority.
(2) When the network addresses agree with each other but the priority does not, the path with priority Q is established.

Since the path with the priority 0 is the default, it is recommended that it be registered in the routing table to prevent the elimination of the path on the way.

Figure 7:
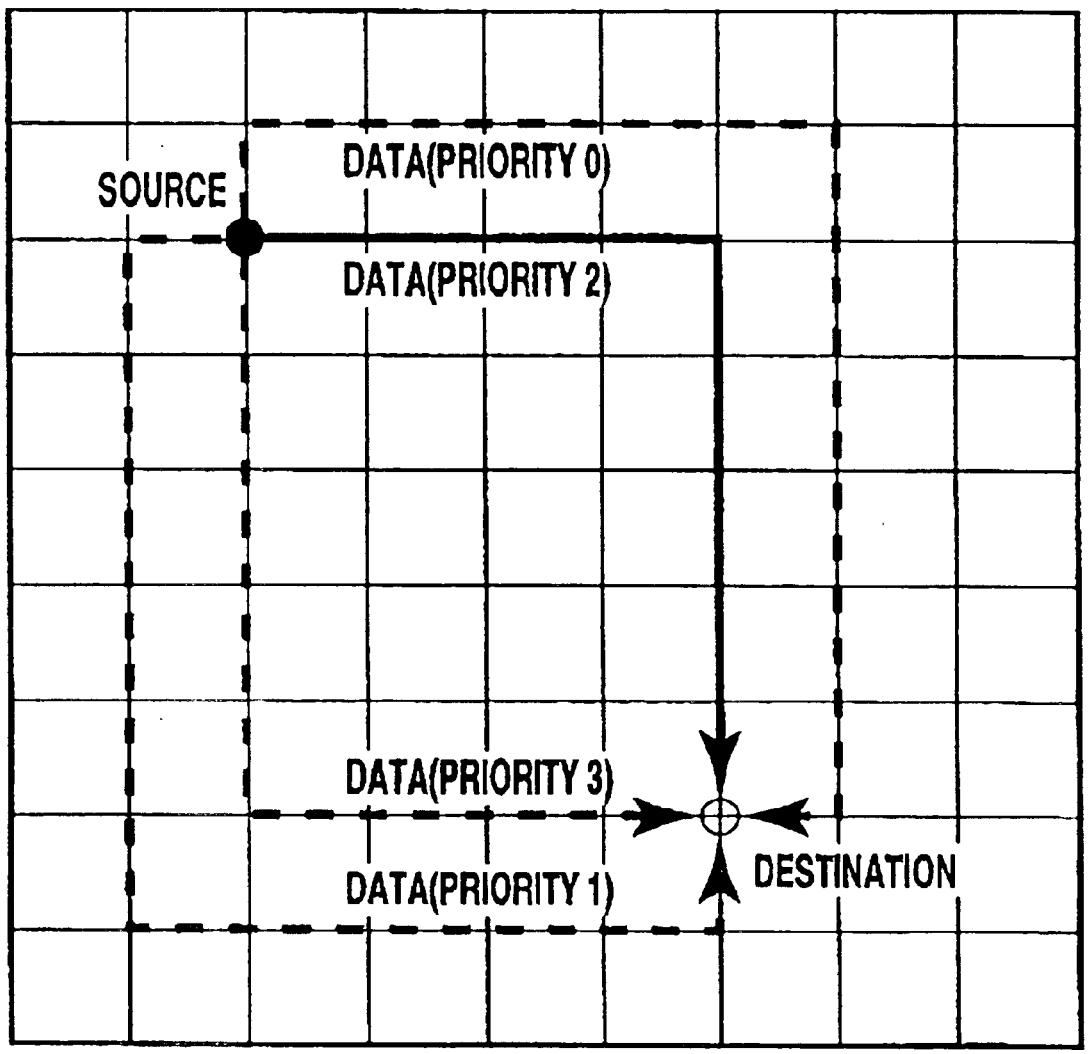
FIG. 7 is a diagram showing a simultaneous communication state of different priority communication packets from the same source node to the same destination node.

FIG. 7 illustrates a state in which communication packets with different orders of priority are simultaneously transmitted from thee same source node to the same destination node. In FIG. 7, communication nodes are present at intersections of the two-dimensional lattice. The communication packets with four orders of priority from priority 0 to priority 3 are being transmitted simultaneously from the source node to the destination node through different paths. For example, although the path with the priority 0 is established such that communication packets from other communication nodes are allowed to pass through that same path to the destination node, the path with the priority 3 is established such that only communication packets with the priority 3 are allowed to pass from the source node to the destination node in FIG. 7. This can implement an exclusive line on which no collision takes place with other communication packets, and which has low latency and high throughput.

Although in a normal network a single path is established through which communication is carried out at a certain moment, the different orders of priority enable simultaneous communications through different paths. In addition, such setup can broaden the bandwidth between the source node and the destination node.

Figure 8:
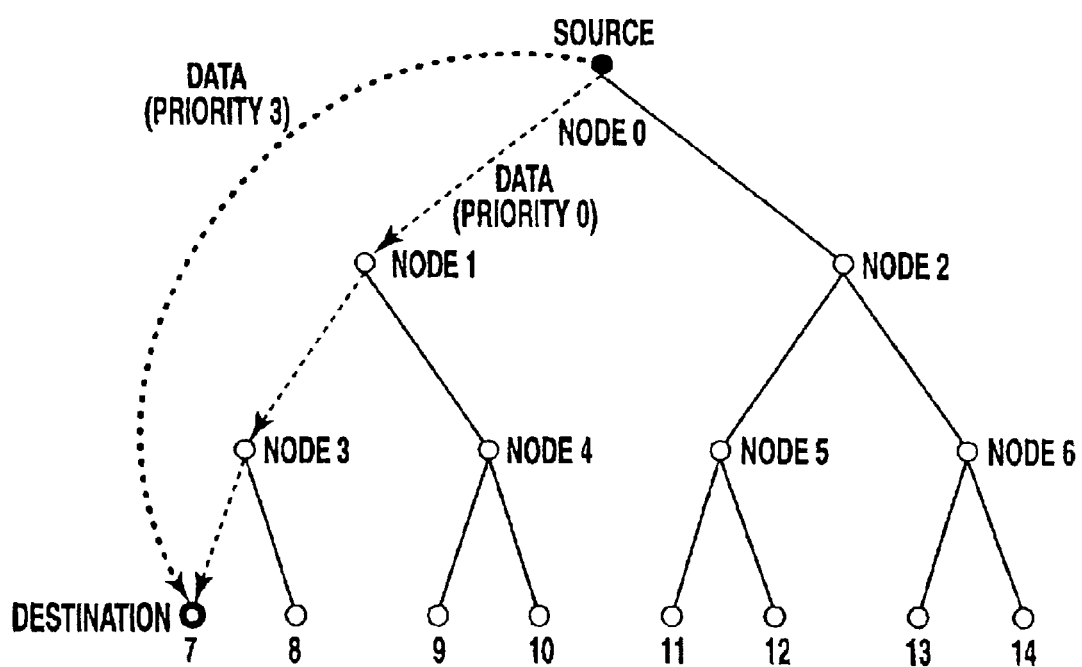
FIG. 8 is a diagram illustrating path control in accordance with priority in tree structure employed in a decentralized control system.

The distributed system for control often adopts such a tree structure as shown in FIG. 8. In FIG. 8, all the lines (solid lines, a dotted line and broken lines) denote physical communication paths. When communicating from a communication node 0 to a communication node 7 in FIG. 8, although a communication packet of priority 0 with a low real-time demand is passed through the communication nodes 1 and 3 on the way, a communication packet of priority 3 with a high real-time demand is transmitted straight from the communication node 0 to the communication node 7. In this case, setting the dotted path such that it passes only communication packets of priority 3 makes it possible for communications packets of other orders of priority to pass through other paths. This can implement between the same communication nodes a low latency and high throughput exclusive line free from the disturbance by other packets with different priority.

FIG. 8 also illustrates that later expansion (of the dotted path) can be achieved easily when it is found after the system setup that the communication latency is too long or the bandwidth is insufficient. For example, a system designer, who initially plans a system for decentralized control with a tree architecture (as shown in FIG. 8 without the dotted line), may find that the real system fabricated cannot satisfy the communication latency from the node 0 to the node 7 by any means. Applying the present invention readily enables later expansion by providing a new physical communication path (the dotted path of FIG. 8) between the node 0 and node 7, and by routing in accordance with the priority (3, in this case), thereby eliminating the problems of the latency or bandwidth.

As described above, the present invention can establish different paths for the communication packets that have the same source node and the same destination node, but have different orders of priority. This makes it possible to establish one or more exclusive lines or one or more alternative paths that can achieve simultaneous communications, and to construct a real-time communications system with a short unit quantum time.

Changing the priority of the communication packet at each communication node can accelerate or decelerate the communication packet, change the routing, and implement the real-time communication control in the decentralized management.

The priority change can be carried out using the routing table (routing control table) as shown in FIG. 6. In FIG. 6, the routing table is referred to in order to determine the output port number or numbers based on the network address and priority. In this case, in a priority unchanged mode (in which the priority change bit of FIG. 6 is disabled), the priority is kept unchanged. In a priority change mode (in which the priority change bit of FIG. 6 is enable), on the other hand, the old priority is replaced by a new priority when transmitting from the output port. In other words, although the priority of the communication packet in the current node is determined by the priority assigned to the header of the input packet so that the overtaking and routing are decided based on that priority, the priority of the communication packet at the next node can be controlled. Thus, the acceleration or deceleration of the communication packets in both the routing and the overtaking based on the priority can be implemented under the decentralized management control. The setup of the routing table is carried out by software (such as decentralized management by a distributed operating system), but the routing (path control) itself is carried out by hardware.

The foregoing structure according to the present invention can implement a real-time communication by carrying out the overtaking of the communication packets in accordance with the priority without requiring any retransmission at each communication node. At the same time, the priority of the communication packets can be changed at each communication node, which enables the acceleration or deceleration of the communication packets and: the routing control, and can implement the real-time communication control for decentralized management. In addition, the function that can establish different paths for the communication packets with the same network addresses in accordance with the priority makes it possible to establish one or more exclusive lines or one or more alternative paths. This also makes it possible to implement the real-time communication control satisfying both the latency and bandwidth in the path control. Furthermore, since the system is a decentralized management type, even if a fault taking place on a communication path blocks the path, the communication service can be continued through another path without undergoing the effect of the fault. Moreover since the routing table can be dynamically rewritten by means of software, another path can be established to avoid the fault node, thereby improving the robustness of the communications.

The present invention can be exploited on Responsive Link, which is a real-time communication standard of Responsive Processor for parallel/distributed real-time control which is researched and developed by Electrotechnical Laboratory in Agency of Industrial Science and Technology of Ministry of International Trade and Industry of Japan.

Figure 9:
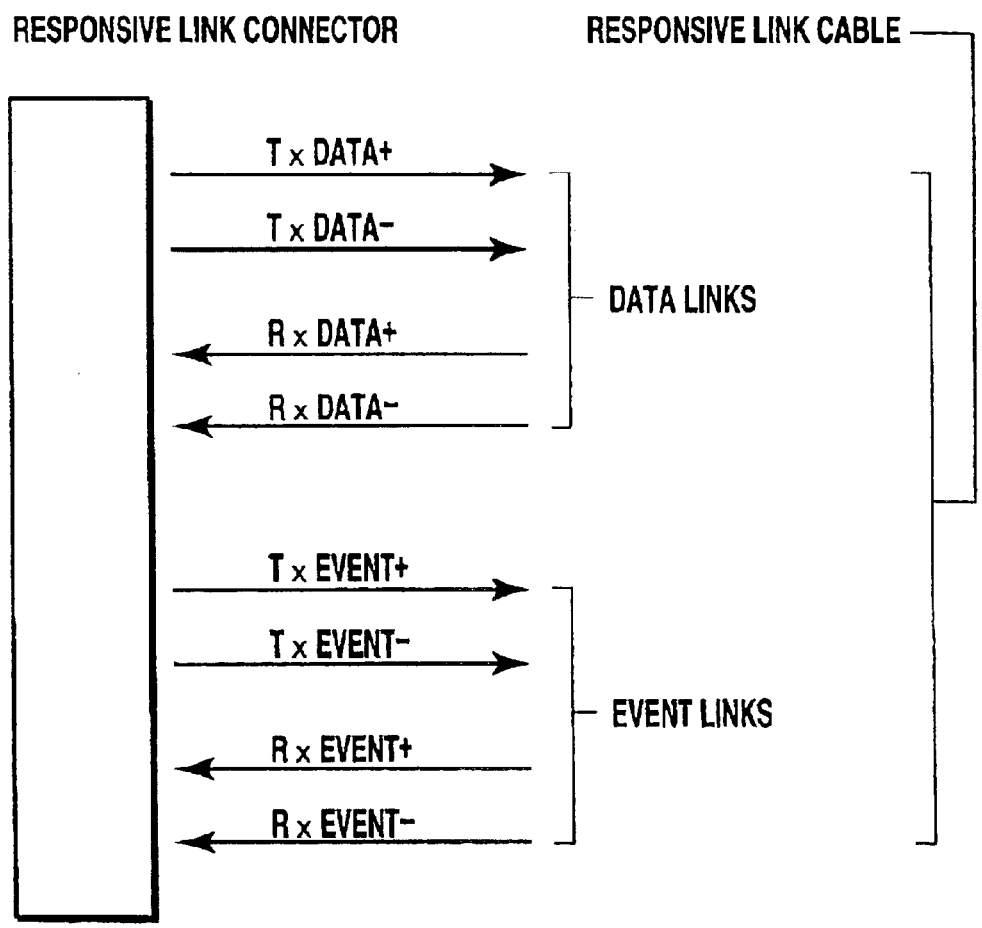
FIG. 9 is a diagram showing Responsive Link signals and a connector through which an event link and a data link can perform full-duplex transmission and reception at the same time.

The Responsive Link as shown in FIG. 9 separates event links for hard real-time communications ensuring low latency for control from data links for soft real-time communications ensuring the bandwidth for the multimedia data transmission (see, Japanese patent application laid-open No. 10-307803 (1998)), and exploits the present invention to implement the real-time communication. The Responsive Link has a 5-input, 5-output configuration as shown in FIGS. 4A and 4B, in which the link 0 is connected to its own CPU, and four links 1–4 carry out the output and input of the data to and from the outside.

As shown in FIG. 9, input ports and output ports constitute a pair of connector/cable, which perform differential input and output to improve noise resistance, and the event links and data links can each transmit and receive at the same time.

Figure 10B:
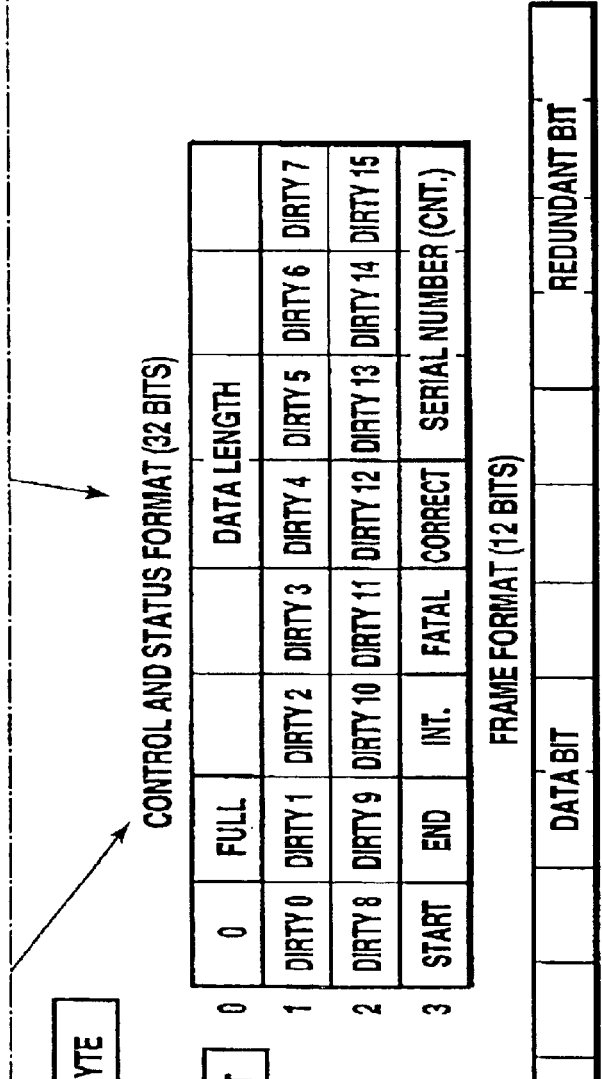
FIG. 10B is a diagram showing the Responsive Link packet format.

FIGS. 10A and 10B is a diagram showing a packet format of the Responsive Link. The packet format of the Responsive Link as shown in FIGS. 10A and 10B includes an event header section and a data header section, in each of which 32-bit network addresses (source address (16 bits) and destination address (16 bits)) are embedded together with priority. In addition, the most significant bits of the source address and destination address constitute priority bits of 1 and 0, forming the 2-bit (four) orders of priority.

Figure 11:
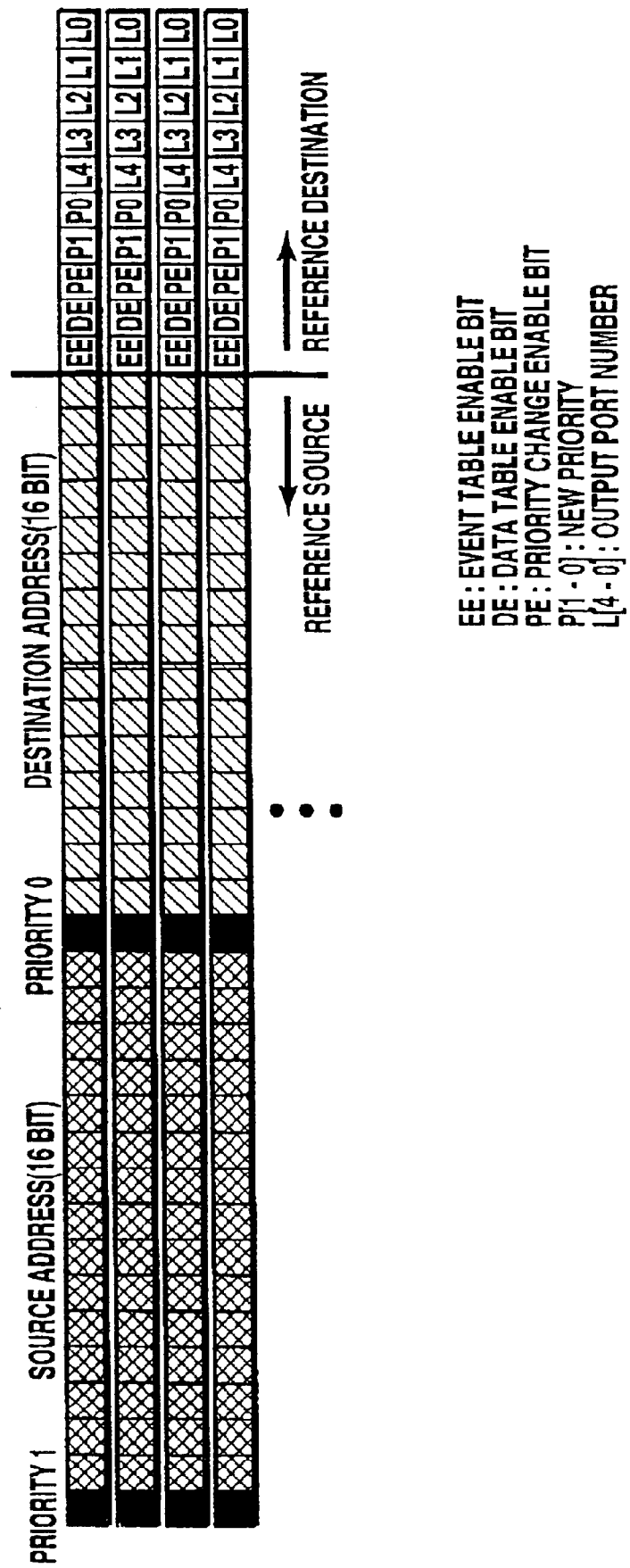
FIG. 11 is a diagram showing a Responsive Link routing table.

FIG. 11 is a diagram showing a routing table of the Responsive Link. The routing table as shown in FIG. 11 comprises a primary section consisting of the header sections themselves of the input packet (the priority embedded source address and destination address). A secondary section consists of the following.

EE (Event table Enable) representing that it is an event link table.

DE (Data table Enable) representing that it is a data link table.

Output port number (link strobe: L0–L4) representative of a link to which the output is directed.

Priority change enable bit (PE).

New priority (P0 and P1).

In FIGS. 4A and 4B, when a communication packet is supplied to the input port (input 0–4), the header section of the table in FIG. 11 is referred to in order to obtain its output port number, priority and priority change enable bit. The priority is supplied to the priority arbiter of the output port (one of the outputs 0–4) obtained from the output port number. The priority arbiter on the output side immediately enables the output when the input is supplied only to a single input port. On the other hand, when the inputs are supplied to a plurality of input ports (that is, when the collision between the communication packets takes place), the output with the highest priority input is enabled in accordance with the priority (using the round robin scheduling when the priority is the same).

The communication packets detained by the priority arbiter are stored in the buffer (buffers 00–43) of FIGS. 4A and 4B, and are sent after the higher priority communication packets have been outputted. When the communication packets to be outputted are being detained to such a point as the buffer is about to overflow (that is, until only one vacant buffer is available), they are saved in the back-end SDRAM (synchronous DRAM). When the buffer becomes vacant by outputting the communication packets stored therein, the communication packets are restored from the SDRAM to the buffer considering the priority to be outputted.

If the priority change enable bit (P E) as shown in FIG. 11 is enabled when the communication packet is supplied to the output port, the priority (Priority 0 and Priority 1) is changed to new priority (P1 and P0), whereas the priority is maintained when the PE is disabled. Using the routing table as shown in FIG. 11 according to the present invention makes it possible to establish different paths for the communication packets having the same network addresses but different priority. Using the different paths can implement the simultaneous communications of the communication packets with different orders of priority. Although the path control based on the priority change and priority of the communication packets is carried out using hardware referring to the routing table, the management and control of the routing table is carried out by means of software (such as a real-time distributed operating system), thus implementing the real-time communications for decentralized management.

The present invention can implement a real-time communications system with decentralized management that cannot be implemented conventionally. The implementation comprises the following.

(1) Overtaking of the communication packets in accordance with the priority.

(2) Priority change at respective communication nodes.

(3) Path control in accordance with the priority. These techniques can offer the following advantages that make it possible to:

Implement real-time communication with a very short quantum time.

Obviate the need for retransmission.

Implement simultaneous communications through different paths between the same communication nodes.

Achieve later expansion with regard to the communication latency and bandwidth.

Connect far more communication nodes than the centralized management type;

Carry out robust communications even if part of communication paths is damaged.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A communications method in a communications system having one or more communication nodes each of which is provided with an information processor, said communications method comprising the steps of:

accepting an incoming communication packet with a priority at one of the communication nodes; and controlling, when a plurality of communication packets accepted at the step of accepting at said one of the communication nodes have the same output destination, a communication packet with a higher priority to be outputted first, wherein said step of controlling comprises the substeps of:

buffering, at said one of the communication nodes, by using a plurality of packet overtaking buffers provided for individual input ports, a communication packet to be overtaken in accordance with the priority when a collision takes place between communication packets;

making an output request from each input port side to one or more output port sides, the output request with the priority assigned to an input communication packet;

carrying out arbitration of output from said each input port side using a priority arbiter for the communication packets which is allocated to each output port; and outputting an input packet to each output port side independently in accordance with the output arbitration.

2. The communications method as claimed in claim 1, further comprising the step of controlling acceleration or deceleration of the communication packet by changing the priority of the communication packet at said one of the communication nodes.

3. A communications system having one or more communication nodes each of which is provided with an information processor, at least one of the communications nodes comprising:

means for accepting an incoming communication packet with a priority, and means for controlling, when a plurality of communication packets accepted by the means for accepting have the same output destination, a communication packet with a higher priority to be outputted first, wherein said control means comprises:

means for buffering, by using a plurality of packet overtaking buffers provided for individual input ports, a communication packet to be overtaken in accordance with the priority when a collision takes place between communication packets;

means for making an output request from each input port side to one or more output port sides, the output request with the priority assigned to an input communication packet;

means for carrying out arbitration of output from said each input port side using a priority arbiter for the communication packets which is allocated to each output port; and means for outputting an input packet to each output port side independently in accordance with the output arbitration.

4. The communications system as claimed in claim 3, wherein said at least one of the communications nodes further comprises means for controlling acceleration or deceleration of the communication packet by changing the priority of the communication packet.

5. A communications method in a communications system having one or more communication nodes each of which is provided with an information processor, said communications method comprising the steps of:

accepting an incoming communication packet including a network address and a priority at one of the communication nodes; and outputting a communication packet accepted at the step of accepting at said one of the communication nodes to another communication node in accordance with the network address and the priority of the communication packet, wherein said step of outputting is able to output, when network addresses of communication packets are the same and priorities of the communication packets are different from each other, the communication packets to different communication nodes in accordance with the priorities of the communication packets, said step of outputting determines one or more communication nodes to which the accepted communication packet is to be outputted by referring to a routing table by using a pair of the network address and the priority of the accepted communication packet, and outputs the accepted communication packet to the determined communication nodes, wherein said routing table has correspondence between a pair of a network address and a priority, and one or more communication nodes to which a communication packet is to be outputted, and said routing table further has correspondence between a pair of a network address and a priority, and a new priority, and said step of outputting determines, by referring to the routing table by using the pair of the network address and the priority of the accepted communication packet, one or more communication nodes to which the accepted communication packet is to be outputted and a new priority, replaces the priority of the accepted communication packet with the determined new priority, and outputs the accepted communication packet to the determined communication nodes.

6. A communications system having one or more communication nodes each of which is provided with an information processor, at least one of the communications nodes comprising:

means for accepting an incoming communication packet including a network address and a priority; and means for outputting a communication packet accepted by the means for accepting to one or more communication nodes in accordance with the network address and the priority of the communication packet, wherein said means for outputting is able to output, when network addresses of communication packets are the same and priorities of the communication packets are different from each other, the communication packets to different communication nodes in accordance with the priorities of the communication packets, said means for outputting determines one or more communication nodes to which the accepted communication packet is to be outputted by referring to a routing table by using a pair of the network address and the priority of the accepted communication packet, and outputs the accepted communication packet to the determined communication nodes, wherein said routing table has correspondence between a pair of a network address and a priority, and one or more communication nodes to which a communication packet is to be outputted, and said routing table further has correspondence between a pair of a network address and a priority, and a new priority, and said means for outputting determines, by referring to the routing table by using the pair of the network address and the priority of the accepted communication packet, one or more communication nodes to which the accepted communication packet is to be outputted and a new priority, replaces the priority of the accepted communication packet with the determined new priority, and outputs the accepted communication packet to the determined communication nodes.

* * * * *

UNITED STATES PATENT AND TRADEMARK OFFICE
CERTIFICATE OF CORRECTION

PATENT NO. : 6,901,074 B1
DATED : May 31, 2005
INVENTOR(S) : Nobuyuki Yamasaki

It is certified that error appears in the above-identified patent and that said Letters Patent is hereby corrected as shown below:

Column 5,
Line 56, before "same" insert -- the --.

Column 6,
Line 11, after "implied" remove "6".
Line 58, after "sources node and" remove "26".
Line 61, change "enables" to -- enable --.

Column 7,
Line 7, change "Q" to -- 0 --.
Line 14, change "thee" to -- the --.

Column 8,
Line 19, change "enable" to -- enabled --.

Signed and Sealed this

Seventh Day of February, 2006

JON W. DUDAS
*Director of the United States Patent and Trademark Office*